(12) United States Patent
Smathers

(10) Patent No.: US 7,400,622 B2
(45) Date of Patent: Jul. 15, 2008

(54) METHOD AND APPARATUS FOR ALLOCATING A TRANSPORT IDENTIFIER FOR A NETWORK DATA CONNECTION

(75) Inventor: Kevin Smathers, Hayward, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 968 days.

(21) Appl. No.: 10/629,474

(22) Filed: Jul. 29, 2003

(65) Prior Publication Data

US 2005/0025156 A1 Feb. 3, 2005

(51) Int. Cl.
*H04L 12/28* (2006.01)
(52) U.S. Cl. .................................. 370/389; 370/392
(58) Field of Classification Search .................. None
See application file for complete search history.

(56) References Cited

U.S. PATENT DOCUMENTS

| | | | |
|---|---|---|---|
| 5,371,852 A * | 12/1994 | Attanasio et al. ............ 709/245 |
| 5,941,988 A | 8/1999 | Bhagwat et al. |
| 6,122,276 A | 9/2000 | Boe et al. |
| 6,338,078 B1 | 1/2002 | Chang et al. |
| 6,453,354 B1 | 9/2002 | Jiang et al. |
| 6,691,168 B1 * | 2/2004 | Bal et al. ..................... 709/238 |
| 2003/0037154 A1 * | 2/2003 | Poggio et al. ............... 709/230 |
| 2003/0227930 A1 * | 12/2003 | Choi et al. .................. 370/401 |

* cited by examiner

*Primary Examiner*—Robert W Wilson

(57) ABSTRACT

A method and apparatus is disclosed for allocating a transport identifier for network data connections of a processor arrangement. Dynamic transport identifiers may be associated with data connections of the processor arrangement. Association of duplicate dynamic transport identifiers is permitted for two or more of the data connections of the processor arrangement. The destination for data received at the first processor arrangement may be resolved from the two or more data connections based on the associated dynamic transport identifier and network identifier.

18 Claims, 3 Drawing Sheets

METHOD AND APPARATUS FOR ALLOCATING A TRANSPORT IDENTIFIER FOR A NETWORK DATA CONNECTION

FIELD OF THE INVENTION

The present disclosure relates in general to processor arrangements communicating over networks, and in particular to protocols of the networks.

BACKGROUND

Over the past decades, the Internet has evolved from a special purpose collection of military and academic networks to a vital carrier of communications for many people around the world. The widespread use of email clients and web browsers helped fuel the Internet's use by the general populace. Newer applications such as file sharing and instant messaging have further increased the traffic on the Internet.

The Internet is built upon the Internet Protocol (IP). An important portion of IP traffic on the Internet uses the Transport Control Protocol (TCP) to provide reliable, connection oriented data transmissions. The protocols behind many user applications such as email and web browsing rely on TCP/IP.

Besides ensuring data reliability, TCP also acts to demultiplex incoming IP data. For example, a computer may have a single, physical network connection that includes simultaneous virtual connections to various remote hosts. The virtual connections are used by one or more applications running on the computer to communicate with those remote hosts. The task of demultiplexing incoming data refers to delivering data received from the IP to the appropriate virtual connection.

The IP protocol ensures best-effort data delivery to the computer, but is not concerned with what happens to the data once it is delivered. Transport protocols such as TCP and Universal Datagram Protocol (UDP) deal with, among other things, deciding which connection should receive the incoming data, thus ensuring the data is delivered to the appropriate application.

TCP and UDP accomplish this demultiplexing by the use of port numbers. Ports numbers are represented by 16-bit values embedded in the transport headers of each data packet. For each connection, a port is associated with both the local and remote machines. The TCP examines the destination port of each incoming TCP/IP packet and delivers the data to the virtual connection associated with that port.

A majority of the approximately 64,000 possible port numbers on any computer can be dynamically allocated for use for incoming and outgoing connections. The TCP/IP protocol was designed at a time when hundreds of simultaneous virtual connections between computers was the most anyone could imagine needing.

However, the explosion of Internet applications such as peer-to-peer (P2P) messaging has required that servers maintain a very large number of simultaneous TCP connections to message clients in order to resolve issues of firewall transparency and to minimize latencies in the message path. It is possible that a collection of applications could exhaust the TCP connections that are supported with 16-bit port numbers.

SUMMARY

Methods and apparatus are disclosed for providing transport identifiers for communicating with one or more processor arrangements over a network. In one embodiment, dynamic transport identifiers may be associated with data connections of the processor arrangement. Association of duplicate dynamic transport identifiers is permitted for two or more of the data connections of the processor arrangement. The destination for data received at the first processor arrangement may be resolved from the two or more data connections based on the associated dynamic transport identifier and network identifier.

DETAILED DESCRIPTION

Figure 1:
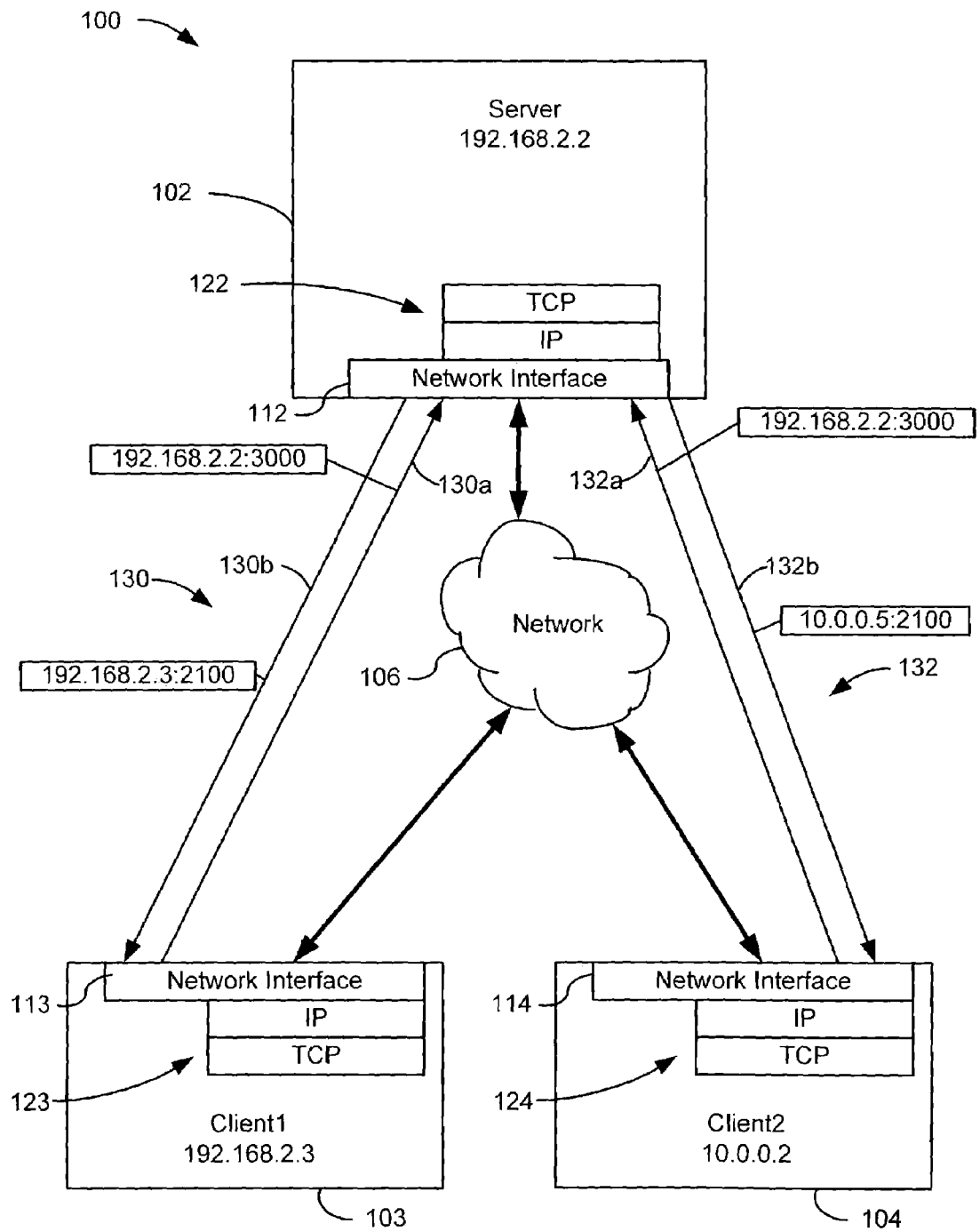
FIG. 1 is a system diagram showing a server and clients communicating using TCP/IP according to embodiments of the present invention.

In the following description of various embodiments, reference is made to the accompanying drawings which form a part hereof, and in which is shown by way of illustration various example manners in which the invention may be practiced. It is to be understood that other embodiments may be utilized, as structural and operational changes may be made without departing from the scope of the present invention.

In general, the present disclosure relates to allocating transport layer connection identifiers such as transmission control protocol (TCP) ports. These connection identifiers can be dynamically allocated for establishing connections with other hosts. The allocation may be performed in such a way as to prevent the word size of the identifier from being a limitation on the number of simultaneous identifiers in use on one system.

The following description uses examples of the TCP/IP protocol for purposes of illustration. It will be appreciated by those skilled in the art that the concepts described may be applied to other transport and/or network protocols, as well as other computer applications where allocation of network connection resources is concerned.

The combination of TCP over IP (TCP/IP) is commonly used to provide connection oriented services over the Internet. Connections are referred to as "sockets" in TCP/IP parlance. A socket is a persistent, virtual connection that provides data transfer across a network. The socket is persistent in that it remains open for data transfer until one of the computers using the socket closes it.

In TCP/IP, a socket is defined by a host identifier (e.g. an IP address or hostname) and a transport identifier (e.g. TCP port). The IP address is a 32-bit number (usually expressed as a four eight bit numbers separated by periods) and used by IP to route data to the correct host. Hostnames are aliases for the IP addresses, and there are various ways to map a hostname to an IP address.

The TCP port number is represented with 16-bits and has at least two purposes. First, certain TCP ports are "well known", that is they are associated with a certain application or service. For example, TCP port 80 is associated with the Hypertext Transfer Protocol (HTTP) and is used for serving Web pages. A Web server offering HTTP services has a process that listens for connections on port 80, and Web browsers may attempt to connect to Web servers on port 80 by default unless otherwise instructed.

The second use of the TCP port is for demultiplexing data. A network interface, for example, an Ethernet card, is associated with one or more IP addresses, therefore all TCP/IP data destined to those addresses are received by the IP layer and then passed to the TCP layer. Since the network connection may support a large number of sockets, it is up to TCP to send the data to the correct recipient process on the machine. The TCP stack uses the TCP port information embedded in the data headers to accomplish this demultiplexing.

A two way TCP/IP connection is sometimes referred to as a socket. A TCP/IP connection between two hosts uses two socket endpoints, one endpoint associated with each host of the connection. Each endpoint may be described by the IP address of the host followed by a colon and the TCP port on which the host receives data. For example, if a client with IP address 192.168.2.3 needs to initiate an HTTP connection with a server with IP address 192.168.2.2, the client may attempt to connect by specifying the destination socket endpoint, 192.168.2.2:80. In order to facilitate return communications, the client machine will also specify a return address for the connection, i.e. define a return socket endpoint. The client forms the return socket endpoint by using its own IP address and using a dynamically allocated TCP port. So, in this example, the client would also specify a socket endpoint of 192.168.2.3:3005, assuming 3005 is available for use on the machine.

Once the client and server have successfully connected in this example, there will be a TCP/IP connection defined by the socket endpoints 192.168.2.2:80/192.168.2.3:3005. Once the connection has been established, the server is free to listen on port 80 again for additional connections. For example, the server could also allow a connection to a second client with IP address 10.0.0.5. This connection can be defined as 192.168.2.2:80/10.0.0.5:3005. For purposes of this example, it is assumed that the second client has, by coincidence, dynamically allocated the same return port number as the first client.

In the above examples, the server has two connections associated with local port 80 and remote port 3005. This is not an unlikely occurrence, especially since the clients independently define return sockets. Because many TCP/IP implementations do not use any randomization to dynamically allocate ports, the allocated ports on client machines tend to lie at the low end of the dynamic port range (e.g. in the 1000's to 3000's). This use of duplicate source and destination ports in simultaneous connections does not cause a problem when demultiplexing data, however. The TCP stack will look not only at the source and destination ports, but also at the source (in this case client) IP address when demultiplexing data. Because the client IP addressees are different in the above example, the data will be delivered correctly.

When a process makes a function call to open a socket, a system call is made to dynamically allocate a port from the TCP. When dynamically allocating TCP ports, the TCP stack generally chooses an unsigned 16-bit integer from a pre-defined range, usually 1024 to 65535. The TCP selects a port (e.g. by choosing the number of the last allocated port plus one) and searches through a collection of ports that are currently in use. If the selected port is not in use, then it is added to the collection of allocated ports and returned to the calling process. If the selected port is in use, then another port is selected, and the process repeated until the entire range of ports has been exhausted, upon which TCP will exit with a failure. As open sockets are closed, the ports associated with those sockets are removed from the collection for use by subsequent dynamic allocation calls.

Although the method described above is used in at least one commonly deployed TCP implementation, the TCP stack may use alternate means of allocating ports. For example, other ways of initially selecting a port may be used, such as randomly generating a port number. Also, the method of determining if a port is in use may differ. Instead of searching through a collection to determine whether ports are in use, an indexed array of bits may be used to mark used and unused ports.

In general, once TCP has allocated a port for use, that port will not be reallocated until it is freed by the associated connection being closed. Therefore, the TCP stack will only allocate the approximately 64,000 available dynamic ports for an associated number of simultaneous connections, and will return an error once any additional dynamic ports are requested.

In systems that process a large number of incoming connections on well known ports, this limitation is not typically a problem. However, many peer-to-peer (P2P) or peer-to-server messaging architectures utilize many simultaneous connections to message clients. These connections may be outbound and thereby require the server to use a large number of dynamically allocated ports. Also, some Interprocess Communications (IPC) utilize dynamically generated ports to communicate via TCP/IP on the local host, further reducing the number of allocable ports.

The limitations inherent in TCP dynamic port allocation may prevent servers from supporting more than 64,000 outbound connections. Changes to the allocation of ports may allow TCP (and other transport protocols) to allocate more than these theoretical maximum ports as described, thereby allowing servers to scale to millions of connections.

Turning now to FIG. 1, a system 100 is illustrated according to various embodiments of the invention. The system includes a server 102 and client 103, 104 computing devices. The computing devices 102-104 may be any manner of generic apparatus for processing digital data. These generic apparatuses may include servers, desktop computers, workstations, portable computers, personal digital assistants, cell phones, microprocessor enabled consumer electronics, or any other similar computing device capable of communicating via the network In the system environment 100, data may be communicated between computing devices 102-104 in any number of known manners. These manners include via a landline network(s) 106, which may include a Global Area Network (GAN) such as the Internet, one or more Wide Area Networks (WAN), Local Area Networks (LAN), and the like. Embodiments of the present invention may be used on devices communicating using any protocols of the network 106, including TCP/IP, Universal Datagram Protocol over IP (UDP/IP), Asynchronous Transfer Mode (ATM), X.25, High Level Data Link Control (HDLC), Fiber Distributed Data Interface (FDDI), Point-to-Point Protocol (PPP) or other wire or fiber network technologies.

The computing devices 102, 103, 104 each include a network interface 112, 113, 114, respectively. The network interfaces 112-114 enable communications over the network 106. To enable communication using TCP/IP, the devices 102, 103, 104 include TCP/IP protocol stacks 122, 123, 124, respectively. The protocol stacks 122-124 may be implemented in any fashion and using any combination of hardware, software, system architecture, and operating system.

In the arrangement of FIG. 1, the server 102 has two simultaneous virtual connections 130, 132 with the clients 103, 104, respectively. These connections 130, 132 are referred to as virtual connections because the physical/electrical data transfer may actually occur through the network 106. The connections 130, 132 may also be direct connections, such as using TCP/IP over PPP.

The example of FIG. 1 is described in terms of the TCP/IP protocol. Therefore each connection 130, 132 includes two TCP/IP sockets. The connections 130, 132 each include a server socket 130a and 132a, respectively, both defined as 192.168.2.2:3000. The client socket 130b of connection 130 is defined as 192.168.2.3:2100 and the client socket 132b of connection 132 is defined as 10.0.0.5:2100.

It will be appreciated that the situation illustrated in FIG. 1 would not occur in a standard TCP/IP stack. Assuming connection 130 was initiated first, the server TCP/IP stack 122 would not allocate port 3000 for the subsequent connection 132. In a TCP/IP stack 122 according to embodiments of the present invention, however, the port 3000 could be allocated again.

In the illustrated example, the TCP/IP stack 122, through some internal mechanism, chose port 3000 for connection 132 even though port 3000 was already allocated to connection 130. However, the TCP/IP stack 122 may be configured to also look at the IP address of the client 102 when allocating the previously used port 3000. Since the client 102 has a different IP address than the client 104 that is currently requesting the connection 132, the TCP/IP stack 122 can safely allocate port 3000 to connection 132. In this way, the TCP/IP stack 122 is only limited in allocating the approximately 64,000 dynamic ports on a per client basis. Dynamically allocated ports having a port number identical to one used by an existing connection may be re-allocated to a new connection assuming the prior connection is not to the same client that is requesting the new connection.

The arrangement shown in FIG. 1 expands the number of dynamically allocable TCP ports, yet does not require any changes to the TCP/IP headers nor does it require any changes to the demultiplexing part of the TCP stack. Recall that the TCP uses the triplet of local port, remote port, and remote IP address to identify the destination of incoming messages. As seen in FIG. 1, the triplet of connections 130, 132 are unique in that respect. Even though remote and destination ports are identical in connections 130, 132, the remote IP addresses are different.

In addition to improving scalability, the TCP/IP stack 122 may also be configured to improve performance when allocating dynamic ports. For example, if the server 102 has allocated a majority of its available dynamic ports over a period of time, the resultant calls to allocate new ports will result in a greater likelihood of matches (i.e. the port is already in use) when searching to see if a port has been allocated. This may result in multiple, expensive, searches through a collection of port numbers to eventually find an unallocated port. However, if most connections are to different hosts (as opposed to large numbers of connections to a single host), the likelihood of finding a previously allocated port when both hostname and port are referenced is quite low. This will result in only one search through the collection in most cases.

It will be appreciated that the TCP/IP stack 122 as configured to expand the number of dynamically allocable TCP ports and improve allocation performance may only need to be included on the server 102 (as opposed to being also included on the client devices 103, 104) to obtain the benefits described. However, it is also possible for the client devices 103, 104 to include a similar arrangement in their TCP/IP stacks 123, 124.

Although the TCP/IP stack 122 has been described as looking at the client IP addresses when allocating ports, other network data may also be used to uniquely allocate ports. For example, the TCP uses sequence numbers in the TCP headers to ensure completeness- and ordering of data packets. Since the TCP has control of these sequence numbers, the port numbers may be allocated by checking a range of sequence numbers instead of the remote IP address.

Figure 2:
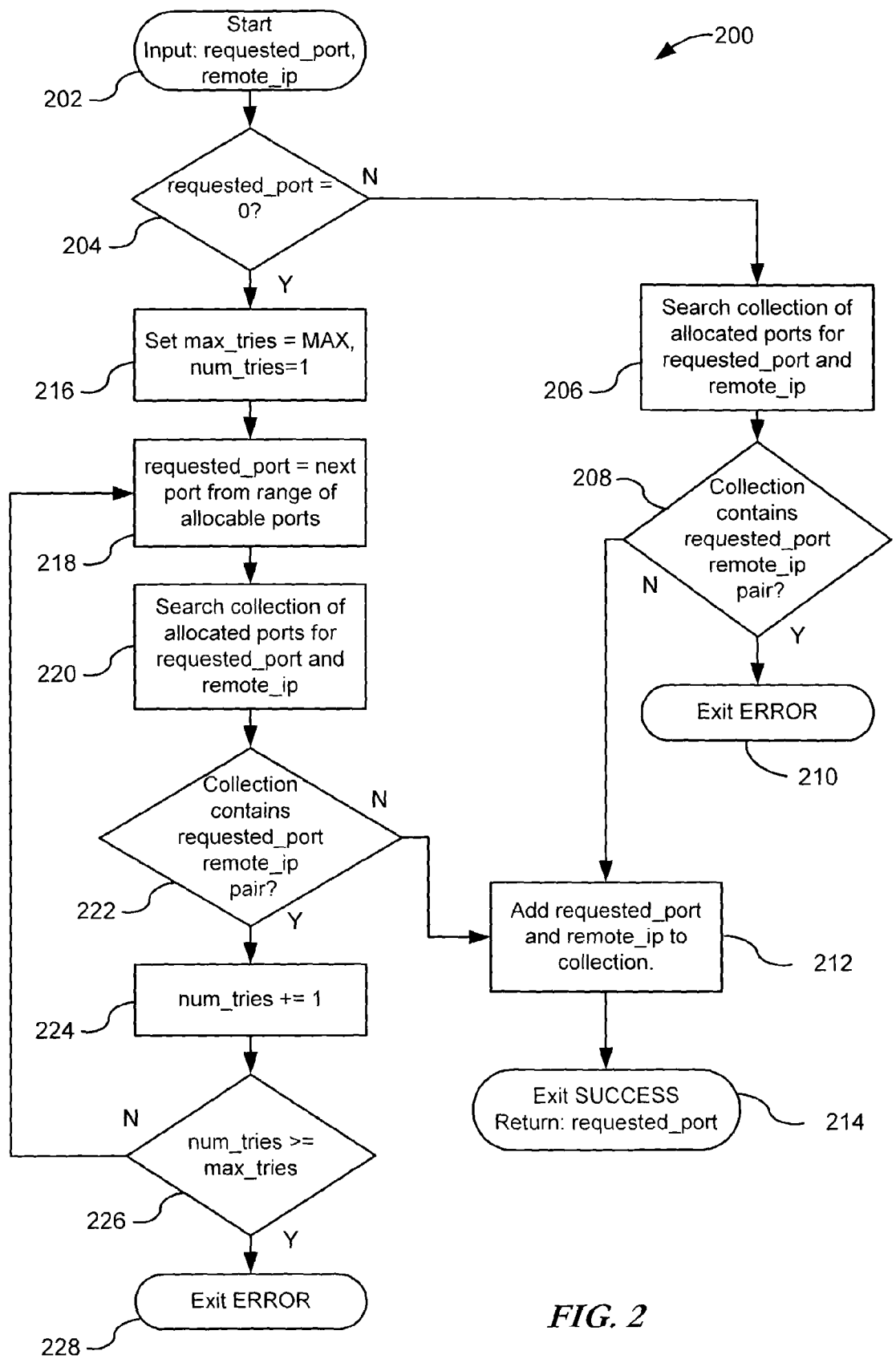
FIG. 2 is a flowchart showing operation of a transport protocol stack according to an embodiment of the present invention.

Turning now to FIG. 2, a flowchart is illustrated showing an example process 200 for allocating a port according to various embodiments of the invention. Process 200 may be implemented in any TCP stack. For example, all or part of process 200 could be used in the tcp_v4_get_port( ) function of the Linux kernel. The process 200 begins (202) with input of a requested port (requested_port) and the IP address of the remote connection (remote_ip). These variables may be passed in by reference or by value, and may be included in or combined with other data structures.

First the variable requested_port is checked (204) to see if it is zero. If not, then the calling process is interested in allocating a specific port. In that case, the routines searches (206) for the combination of requested_port and remote_ip in a collection. The collection may be any data structure suitable for storing variables. In this case, the collection should be suited for fast lookup, therefore a structure such as a hash table is preferred. The elements of the collections may be data structures, references to data structures, or unitary variables formed from the requested_Port and remote_ip variables. For example, the requested_port and remote_ip could be combined into single a 64-bit integer for storage in the collection.

If requested_port and remote_ip are found (208) in the collection, then the routine exits (210) with an error. If the requested_port and remote_ip are not found (208) in the collection, then they are added (212) to the collection and the routine exits (214) with a success. When exiting (214) successfully, the requested_port is returned, either through a return variable or by setting a value passed in by reference. In this case, returning the requested_port variable is unnecessary, because the successful exit (214) indicates that the requested variable was in fact assigned. Although the same variable (i.e. requested_port) is used for the input and output variable of the routine (200), this is only done for convenience of notation. Those skilled in the art will recognize that a different input and output variables may be used in various implementations of the routine.

When the caller does not care what the port is (e.g. when dynamically allocating a port) then requested_port is set to zero, and the check (204) branches to an initialization (216). At initialization (216), a counting variable num_tries is initialized to one, and a limit variable max_tries is initialized to MAX. MAX may be a compile time variable or a function. For example, MAX may be set to a compile time default of 65,535−1,024=64,511. However, this may be altered at runtime on Linux and Unix systems by a call such as sysctl( ).

The port number for requested_port is selected (218) from some potentially available port values. The selection (218) of a variable for requested ort may occur by any mechanism known in the art. A global variable may be set to the lower range of allocable ports at initialization, and thereby incremented each time there is a dynamic allocation such as in 216, 218, 220, 222, 224, and 226 of FIG. 2. Alternate methods to select a port may be to use a randomizing function or to pull the next port from a randomized array of ports that was setup at system initialization.

After port selection (220), the requested_port and remote_ip are searched (220) and checked (222) by mechanisms similar to that described in relation to (206) and (208). As with those parts of the procedure, if the check (222) shows that requested_port and remote_ip are not in use, the program proceeds to update the collection (212) and successfully exit (214).

If the check (222) reveals that the requested_port and remote_ip are in use, then the num_tries variable is incremented (224) and checked (226) to make sure it has not exceeded the maximum number of tries. If the check (226) reveals num_tries<max_tries, the sequence 218, 220, 222, 224, and 226 is repeated. If the check (226) reveals num_tries>=max_tries, then the routine exits (228) with an error.

Figure 3:
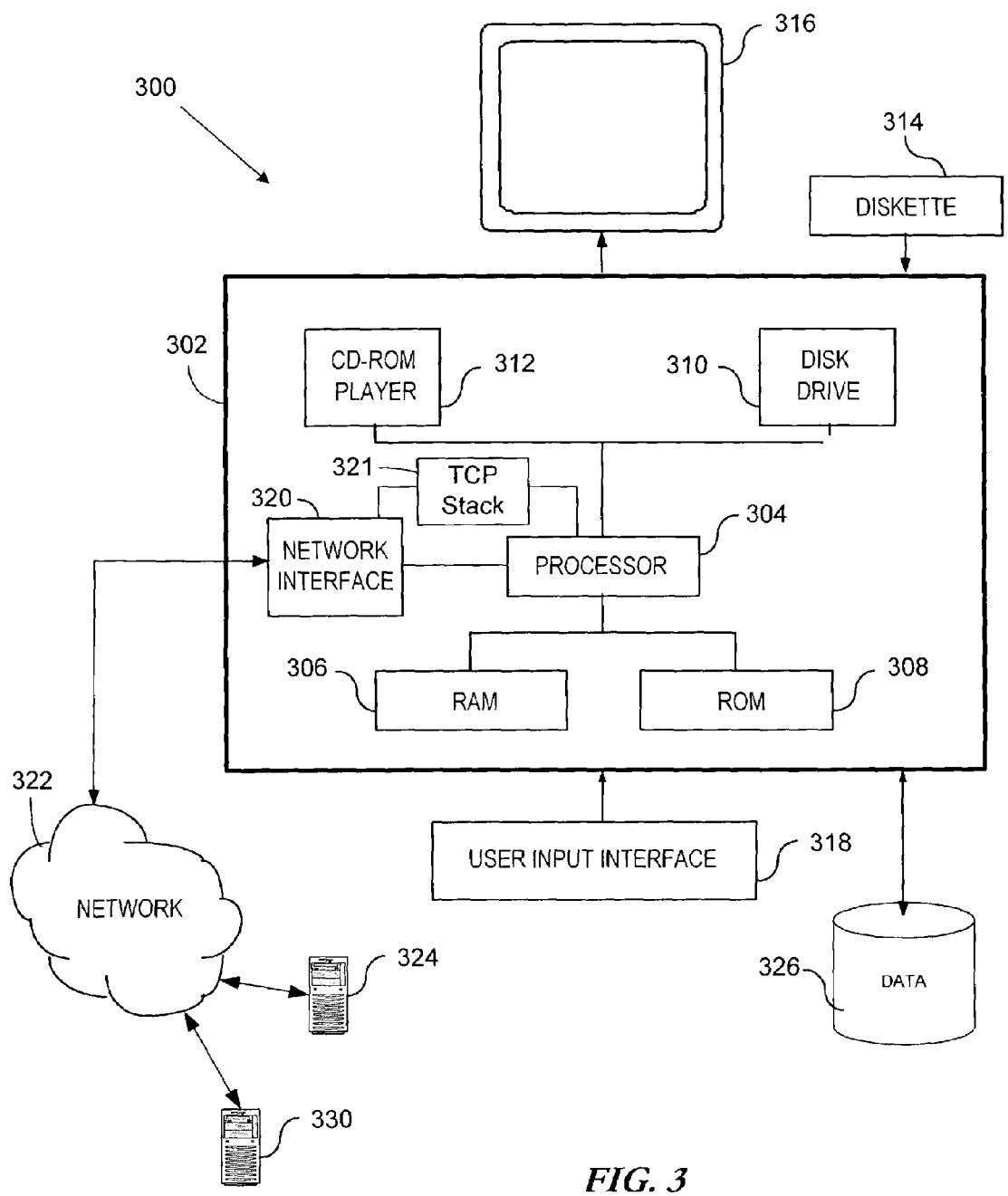
FIG. 3 is a diagram of a system in which a protocol stack may be deployed according to embodiments of the present invention.

In reference now to FIG. 3, a system 300 is shown in which a protocol stack according to embodiments of the present invention may be employed. The system includes a computing apparatus 302 with a processor 304 and coupled to some form of data storage. The data storage may include volatile memory such as RAM 306. Other devices that the apparatus 302 may use for data storage and retrieval include a ROM 308, disk drive 310, CD-ROM 312, and diskette 314. A display 316 and user-input interface 318 are attached to the computing apparatus 302 to allow data input and display. The computing apparatus 302 includes a network interface 320 that allows the apparatus to communicate with other computing devices 324, 330 across a network 322.

In one embodiment of the invention, the computing apparatus 302 connects to the network using a TCP stack 321. The TCP stack 321 may be run in system memory 306, 308, or in virtual memory on any type of disk storage device 310, 314, including a remote data storage 326. The TCP stack 321 is arranged to select and allocate TCP ports for connection to a remote host 324, 330 as described in relation to FIGS. 2 and 3.

From the description provided herein, those skilled in the art are readily able to combine hardware and/or software created as described with appropriate general purpose or system and/or computer subcomponents embodiments of the invention, and to create a system and/or computer subcomponents for carrying out the method embodiments of the invention. Embodiments of the present invention may be implemented in any combination of hardware and software.

The foregoing description of the example embodiments of the invention has been presented for the purposes of illustration and description. It is not intended to be exhaustive or to limit the invention to the precise form disclosed. Many modifications and variations are possible in light of the above teaching. It is intended that the scope of the invention not be limited with this detailed description, but rather the scope of the invention is defined by the claims appended hereto.

What is claimed is:

1. A processor-implemented method, comprising:
    forming a plurality of data connections between an associated plurality of processor arrangements and a first processor arrangement that are coupled via a network, each data connection having an associated network identifier;
    associating respective dynamic transport identifiers of the first processor arrangement with the plurality of data connections;
    permitting association of duplicate dynamic transport identifiers of the first processor arrangement with two or more of the data connections;
    resolving a destination for data received at the first processor arrangement from the two or more data connections based on the associated dynamic transport identifier and network identifier;
    wherein the data connections comprise transmission control protocol (TCP) connections; and
    wherein permitting association of duplicate dynamic transport identifiers for two or more of the data connections comprises determining that respective ranges of TCP sequence numbers of the two or more data connections are different.

2. The method of claim 1, wherein the dynamic transport identifiers comprise TCP ports.

3. The method of claim 1, wherein permitting association of duplicate dynamic transport identifiers for the two or more data connections comprises determining that respective internet protocol addresses of the two or more data connections are different.

4. A processor-implemented method, comprising:
    initiating a plurality of data connections between an associated plurality of processor arrangements and a first processor arrangement that are coupled via a network, each data connection having an associated network identifier
    selecting dynamic transport identifiers from a set of reserved transport identifiers of the first processing arrangement;
    associating the dynamic transport identifiers with data connections;
    permitting association of duplicate dynamic transport identifiers with two or more of the data connections;
    resolving a destination for data received at the first processor arrangement from the two or more data connections based on the associated dynamic transport identifier and network identifier
    wherein the data connections comprise transmission control protocol (TCP) connections; and
    wherein permitting association of duplicate dynamic transport identifiers for two or more of the data connections comprises determining that respective ranges of TCP sequence numbers of the two or more data connections are different.

5. The method of claim 4, wherein the dynamic transport identifiers comprise TCP ports.

6. The method of claim 4, wherein permitting association of duplicate dynamic transport identifiers for the two or more data connections comprises determining that respective internet protocol addresses of the two or more data connections are different.

7. A processor-implemented method, comprising:
    initiating a data connection between a first processor arrangement and a second processor arrangement that are coupled via a network;
    choosing a selected transport identifier for the first processor arrangement, the selected transport identifier identifying the data connection between the first and second processor arrangements;
    searching a collection of unique identifiers for a match to the selected transport identifier, wherein each unique identifier includes a transport identifier and a network identifier and is associated with an existing data connection of the first processor arrangement;
    if no unique identifier of the collection has a transport identifier that matches the selected transport identifier and a network identifier that matches a network identifier of the second processor arrangement, then
        allocating the transport identifier to the data connection;
        forming a new unique identifier from the selected transport identifier and the network identifier of the second processor arrangement; and
        adding the new unique identifier to the collection;
    wherein the data connection comprises a transmission control protocol (TCP) connection; and wherein the network identifier of the second processor arrangement comprises a range of TCP sequence numbers of the data connection and two or more of the unique identifiers in the collection have duplicate transport identifiers and different respective ranges of TCP sequence numbers.

8. The method of claim 7, wherein the selected transport identifier comprises a TCP port.

9. The method of claim 7, wherein the network identifier comprises an internet protocol address of the second processor arrangement.

10. An apparatus, comprising:
a network interface for providing respective data connections between the apparatus and two or more remote data processing arrangements coupled to the apparatus via a network, the data connections using a network transport protocol; and
a processor arranged to
associate respective dynamic transport identifiers with the data connections;
permit association of duplicate dynamic transport identifiers for two or more of the data connections;
resolve a destination for data received at the network interface from the two or more data connections based on the associated dynamic transport identifier and network identifier;
wherein the network transport protocol includes the transmission control protocol (TCP); and
wherein the processor is arranged to permit association of duplicate dynamic transport identifiers for two or more of the data connections by determining that respective ranges of TCP sequence numbers of the two or more data connections are different.

11. The apparatus of claim 10, wherein the dynamic transport identifiers comprise TCP ports.

12. The apparatus of claim 10, wherein the processor is arranged to permit association of duplicate dynamic transport identifiers for two or more of the data connections by determining that respective internet protocol addresses of the two or more data connections are different.

13. A computer-readable medium configured with instructions for causing a processor to perform steps comprising:
initiating a plurality of data connections between an associated plurality of processor arrangements and a first processor arrangement that are coupled via a network, each data connection having an associated network identifier;
selecting dynamic transport identifiers from a set of reserved transport identifiers of the first processing arrangement;
associating respective dynamic transport identifiers with data connections of the first processor arrangement;
permitting association of duplicate dynamic transport identifiers with two or more of the data connections of the first processor arrangement;
resolving a destination for data received at the first processor arrangement from the two or more data connections based on the associated dynamic transport identifier and network identifier;
wherein the data connection comprises a transmission control protocol (TCP) connection; and
wherein permitting association of duplicate dynamic transport identifiers for two or more of the data connections comprises determining that respective ranges of TCP sequence numbers of the two or more data connections are different.

14. The computer-readable medium of claim 13, wherein the dynamic transport identifiers comprise TCP ports.

15. The computer-readable medium of claim 13, wherein permitting association of duplicate dynamic transport identifiers for the two or more data connections comprises determining that respective internet protocol addresses of the two or more data connections are different.

16. A system comprising:
network means for providing a plurality of data connections between a first processing arrangement and a plurality of processing arrangements;
data storage means for storing respective unique identifiers associated with the plurality of data connections, wherein each unique identifier includes a network identifier and a transport identifier dynamically allocated from a set of reserved identifiers of the first processing arrangement;
processor means for allocating the transport identifiers for the first data processing arrangement, wherein the processor means is arranged to allocate duplicate transport identifiers for two or more of the plurality of data connections if the unique identifiers of the two or more data connections include different network identifiers;
wherein the data connections comprise transmission control protocol/internet protocol (TCP/IP) connections; and
wherein the network identifiers comprise ranges of TCP sequence numbers of the data connections and two or more of the unique identifiers have duplicate transport identifiers and different respective ranges of TCP sequence numbers.

17. The system of claim 16, wherein the transport identifiers comprise TCP ports.

18. The system of claim 16, wherein the network identifiers comprise respective IP addresses of the plurality of processing arrangements.

* * * * *

UNITED STATES PATENT AND TRADEMARK OFFICE
CERTIFICATE OF CORRECTION

PATENT NO. : 7,400,622 B2 Page 1 of 1
APPLICATION NO. : 10/629474
DATED : July 15, 2008
INVENTOR(S) : Kevin Smathers It is certified that error appears in the above-identified patent and that said Letters Patent is hereby corrected as shown below:

In column 6, line 56, delete "requested ort" and insert -- requested_port --, therefor.

Signed and Sealed this

Twenty-eighth Day of April, 2009

JOHN DOLL
*Acting Director of the United States Patent and Trademark Office*